Patented Mar. 17, 1936

2,034,077

UNITED STATES PATENT OFFICE 2,034,077

CATALYST AND METHOD FOR PREPARING SAME

Herrick R. Arnold, Elmhurst, and Wilbur A. Lazier, Marshallton, Del., assignors to E. I. du Pont de Nemours & Company, Wilmington, Del., a corporation of Delaware No Drawing. Application January 27, 1932, Serial No. 589,300

16 Claims. (Cl. 23—236)

This invention relates to catalysts and catalytic processes and more particularly to improvements in the preparation and use of hydrogenation catalysts of the non-ferrous metal type.

Catalytic agents adapted for use in hydrogenation reactions may be divided into three main groups. The first and most important group from an industrial standpoint comprises the ferrous metals, and includes finely divided metallic iron, cobalt and nickel catalysts. Secondly, there are the noble metals such as platinum, palladium, osmium, etc., which are sometimes favored as catalysts for hydrogenations conducted on a laboratory scale. Owing to their great cost, these metals have found only limited application in the arts.

The third group, with which the present invention is concerned, comprises the non-noble, non-ferrous metal catalysts. Typical members of this class are copper, zinc, manganese, cadmium, tin, lead and silver. These elements may serve as catalysts in the form of oxides or in a partially or wholly reduced condition. Metallic copper, for example, has been extensively employed in hydrogenation and dehydrogenation reactions. The use of zinc oxide as a catalyst for methanol synthesis and other high-pressure gas phase reactions of course is well known. Certain other non-ferrous hydrogenating metals have been mentioned as catalysts for specific hydrogenation reactions.

The non-ferrous metals are much milder in their action than those of the ferrous metal group and for this reason are employed in order to obtain specific effects depending on the selectivity of the catalyst. On the other hand, they are somewhat less active and offer certain other technical difficulties in connection with their use. Zinc and manganese oxides are quite ineffective as hydrogenation catalysts in liquid media, and the corresponding metals are very difficult to prepare in a finely divided condition, owing to the difficulty with which they may be reduced with hydrogen. Metals of the non-ferrous group have relatively low melting points and are therefore susceptible to loss of activity through sintering by heat.

The present invention has as its object to overcome many of the difficulties in connection with the preparation and use of non-ferrous metal catalysts described above. A further object is to facilitate the preparation of active non-ferrous metal catalysts by the use of suitable supporting materials properly incorporated with the catalytic metals and oxides, by a judicious selection of combinations of metals and oxides, and by the use of precipitation methods that promote an intimacy of contact and uniformity of texture unobtainable by other means. Another object pertains to the new catalyst compositions described herein. Other objects will become apparent from the detailed description of invention given below.

These objects are accomplished in the following manner. It has been found particularly advantageous in the preparation of non-ferrous metal catalysts to employ as starting materials salts of metals that are capable of forming soluble complex ions with nitrogen bases such as ammonium hydroxide. Copper nitrate and zinc nitrate are examples of such salts. When ammonium hydroxide is added in excess to a solution of one or more of these salts, a clear solution is obtained. On heating this solution and slowly discharging the ammonia a precipitate of a sandy character is formed consisting of the metal hydroxide. The formation of the precipitate is further facilitated and its catalytic usefulness improved by suspending a finely divided inert supporting material in the clear solution prior to discharging the ammonia. The particles of supporting material present in the mother liquor at the time of precipitation serve as nuclei around which the precipitated hydroxide may form.

Although the invention is susceptible of wide variation in the manner of its application to the preparation and use of hydrogenation catalysts, both with respect to specific combination of materials and conditions used, the following examples will serve to illustrate how the invention may be carried out in practice.

Example 1

A solution of copper nitrate is prepared by dissolving 480 grams of the crystallized salt in about 6 liters of water. Twelve hundred sixty cc. of 28% ammonium hydroxide is added with stirring. The copper hydroxide at first precipitated, redissolves to give a deep blue clear solution. To this there is added 60 grams of dry powdered kieselguhr. The mixture is heated to about 70° C. and is maintained at this temperature while an energetic stream of air is forced through the suspension. After several hours it is found that the greater part of the ammonia has been expelled and as a consequence hydrated copper oxide is found to have been deposited in the form of a dense granular precipitate on the suspended kieselguhr. The precipitate is washed several times by decantation, and is filtered, dried, and reduced with diluted hydrogen for four hours at a temperature of 200°–300° C. A sample of reduced catalyst prepared as described analyzed 66.5% metallic copper.

Example 2

A mixed salt solution is prepared by dissolving 245 grams of copper nitrate and 297 grams of zinc nitrate in about 6 liters of distilled water. Fifteen hundred cc. of 28% ammonia is added which, on account of being in excess of the salts, gives a clear solution. Sixty grams of kieselguhr is added at this point and the mixture is heated at 70° C. and blown with air as described in Example 1 until all of the excess ammonia has been removed. The precipitate comprising an intimate, sandy mixture of zinc hydroxide, copper hydroxide, and kieselguhr is washed, filtered, dried and reduced in hydrogen for 18 hours at 200°–300° C. Analysis of the reduced catalyst revealed a copper content of 19.5% and a zinc content of 36.9%. By means of a special method of analysis it was found that the reduced zinc content was 0.85%, a value that could be obtained only by reduction of zinc oxide in intimate contact with an easily reducible oxide such as copper oxide.

On subjecting the mixed supported hydrated copper oxide-zinc oxide precipitate to reduction with hydrogen, it has been found that the zinc oxide reduces to a far greater extent than is possible under the same conditions in the absence of the copper. The reduced product is grey in color rather than the characteristic reddish-brown of active metallic copper and possesses an activity far greater than that of the usual reduced copper catalyst.

Example 3

Two hundred and twenty-two grams of zinc nitrate, 25 grams of copper nitrate and 48 grams of cadmium nitrate are dissolved in 4 liters of water. To this solution there is added with stirring 800 cc. of 28% ammonium hydroxide and 100 grams of finely powdered activated charcoal. The suspension is heated to 85° C. and treated with air at this temperature until the solution is practically neutral. The hydroxides of copper, zinc and cadmium admixed with and precipitated upon the activated charcoal are filtered, washed and dried. The catalyst thus prepared may be briquetted for use in a vapor phase process or it may be reduced with hydrogen in the powder form for application in a batch process, liquid phase hydrogenation reaction.

Example 4

A solution is prepared by dissolving 183 grams of anhydrous cadmium chloride and 150 grams of anhydrous stannous chloride in 8 liters of water. One thousand cc. of ammonium hydroxide is added to this solution, which causes the precipitation of both cadmium and stannous hydroxide. The cadmium hydroxide, however, redissolves in the excess ammonia, leaving the stannous hydroxide suspended in the solution. The mixture is heated to 50° C. or over and the excess ammonia is discharged as described in the preceding examples. By this treatment cadmium hydroxide is reprecipitated in a granular form, the particles of stannous hydroxide serving as nuclei for the formation of the minute crystals. In order to obtain a tin-cadmium catalyst, the mixed hydroxides so prepared are subjected to careful reduction with hydrogen at a temperature insufficient to cause substantial sintering of the finely divided metals and for a period suitable for converting a portion of the hydroxides to metals.

Example 5

Eight hundred cc. of strong ammonium hydroxide is added to 10 liters of a 2% solution of silver nitrate. There is added to the solution at this point 200 grams of powdered aluminum oxide gel. The solution is brought to the boiling point and is boiled until the greater part of the ammonia has been expelled, which process results in the substantial precipitation of the silver as silver oxide. The alumina is insoluble in the ammonium hydroxide solution and serves as a catalyst support upon which the finely divided silver oxide is precipitated.

Example 6

A copper-zinc-zinc oxide kieselguhr catalyst prepared as described in Example 2 was employed for the hydrogenation of furfural to furfuryl alcohol. Two hundred grams of vacuum distilled furfural, 100 cc. of water and 20 grams of the catalyst were charged into a small autoclave and subjected to a hydrogen pressure of 1800 lbs. per square inch. The mixture was agitated violently for 2½ hours at a temperature of 150° C. Hydrogen absorption was complete after two or three hours. The catalyst was removed by filtration after which the liquid products were recovered by fractional distillation. Five per cent of the original furfural was recovered unchanged and 70 per cent was found to have been converted to furfuryl alcohol. A copper-kieselguhr catalyst prepared as described in Example 1 gave similar results in the hydrogenation of furfural.

Example 7

One hundred grams of dextrose was dissolved in 200 cc. of water. Twenty grams of a copper-zinc-kieselguhr catalyst prepared as described in Example 2 was added and the mixture agitated with hydrogen at a pressure of 1400 lbs. and a temperature of 130°–150° C. Sorbitol containing negligible amounts of dextrose was obtained by filtration and evaporation of the reduced solution.

The invention is applicable to any precipitated catalyst comprising an oxide or hydroxide of a metal that is soluble in excess of ammonium hydroxide and that can be regenerated as the hydroxide by decreasing the ammonia concentration. Such elements are, for example, zinc, copper, silver, and cadmium. They may, however, be used in combination with other non-ferrous hydrogenating metal hydroxides which do not possess the property of dissolving in an excess of the precipitating agent.

In carrying the invention out in practice, the soluble salts of one or more metals forming a complex ion with ammonia may be dissolved in water, an excess of ammonia added, and inert suspended matter added to the clear solution prior to discharging the excess ammonia. Alternatively, the precipitated hydroxide of a non-ferrous metal not belonging to the class of complex ion formers may be used in conjunction with one of the metals named above, the insoluble hydroxide then forming the nuclei about which the new precipitate is formed during elimination of the excess of reagent.

The catalytic metal hydroxides may be precipitated upon suitable supports either singly or in combination of two or more, the most satisfactory results being obtained in employing mixtures of readily reducible hydroxides together with more difficultly reducible oxides. In this way the reduction of the difficultly reducible oxide is greatly facilitated, and the procedure results in catalysts having the properties of active metals not otherwise obtainable. For example, by coprecipitating copper and zinc hydroxides from an excess of ammonia and reducing the resulting mixture, a reduced catalyst is obtained having the properties of a metallic zinc catalyst, even though the extent of reduction of the zinc oxide is quite small.

Composite hydroxide catalysts prepared by the present invention may be granulated or briquetted for use in vapor phase hydrogenation or they may be reduced in the powder form for use in liquid media. In carrying out our hydrogenations the usual procedure will be to agitate the liquid or solution to be hydrogenated with a small portion of the reduced powder in a compressed atmosphere of hydrogen.

The exact concentrations of reagents to be used are subject to wide variations depending upon the particular elements comprising the catalyst composition to be made. In general, the more dilute the initial salt solution, the larger the excess of ammonia that will be required for formation of the soluble complex.

Instead of using air, other gases such as carbon dioxide hydrogen, or nitrogen may be used for expelling the excess of the volatile base. In some instances this may be performed merely by boiling the solution. Other volatile, water-soluble bases chemically similar to ammonia, for example a solution of methyl amine, may be used for formation of the complex soluble salt.

As catalyst carriers, a number of materials such as kieselguhr, powdered silica gel, alumina gel, activated charcoal, or fuller's earth may be used. The functions of the supporting material are two-fold. The fine particles suspended in the mother liquor during precipitation form nuclei about which the formation of crystals of the precipitated hydroxide take place. Secondly, during subsequent reduction with hydrogen, the inert supporting material prevents the coalescence of the tiny particles of reduced metal, thereby helping to maintain the surface in a rugged state.

The catalysts of the present invention are applicable to a wide variety of uses. They are particularly useful for reactions of hydrogenation and dehydrogenation. Such compounds as those containing the carbonyl group are particularly susceptible to hydrogenation by non-ferrous metal catalysts. Aldehydes and ketones may be reduced to the corresponding alcohols, sugars to polyalcohols, acids and esters to the corresponding alcohols or hydrocarbons. Various compounds containing other unsaturated groups such as the nitrocompounds and nitriles may also be hydrogenated. The non-ferrous metal hydrogenation catalysts of the present invention find specialized applications in hydrogenations of a selective nature. For example, aromatic aldehydes and ketones may be hydrogenated to aromatic alcohols, and furfural may be converted to furfuryl alcohol or methyl furfurane. In these and other instances the carbonyl group is reduced without saturation of the unsaturated ring. A large number of dehydrogenation reactions may be carried out by use of the catalysts of this invention among which may be mentioned the conversion of alcohols to aldehydes or ketones, the synthesis of camphor from isoborneol, and the conversion of hydroaromatic compounds to the corresponding aromatic compounds.

The usual methods of precipitation of metallic hydroxides yield gelatinous precipitates that can be effectively washed only with the greatest difficulty. In the present instance the precipitates are produced in a finely granular condition and have a relatively high density, which greatly facilitates washing and filtration. The use of fixed alkalies is likewise avoided. Consequently products of high purity are obtained which are free from catalyst poisons or other noxious impurities.

The above description and examples are to be taken as illustrative only and not as limiting the scope of the invention. Any modification or variation therefrom which conforms to the spirit of the invention is intended to be included within the scope of the claims.

We claim:

1. A catalyst composition suitable for hydrogenation and dehydrogenation reactions prepared by suspending an inert supporting material in an ammoniacal solution of a copper salt and a zinc salt, said solution containing ammonia in excess of that stoichiometrically required to precipitate the hydroxides, coprecipitating on the supporting material hydroxides of copper and zinc, and separating the mixture of copper and zinc hydroxides and supporting material from the solution.

2. A process for preparing a catalyst composition suitable for hydrogenation and dehydrogenation reactions, which comprises suspending an inert supporting material in an ammoniacal solution of a copper salt and a zinc salt, said solution containing ammonia in excess of that stoichiometrically required to precipitate the hydroxides, then coprecipitating on the supporting material hydroxides of copper and zinc by removing ammonia from the solution, and separating the mixture of supporting material and hydroxides of copper and zinc from the solution.

3. A process for preparing a catalyst composition suitable for hydrogenation and dehydrogenation reactions, which comprises preparing an ammoniacal solution of a copper salt and a zinc salt, said solution containing ammonia in excess of that stoichiometrically required to precipitate the hydroxides, suspending in said solution an inert supporting material, then coprecipitating on the supporting material hydroxides of copper and zinc, separating the mixture of supporting material and hydroxides of copper and zinc from the solution, and subjecting the precipitate to reduction with hydrogen.

4. A catalyst composition suitable for hydrogenation and dehydrogenation reactions prepared by dissolving a copper salt and a zinc salt in water, adding ammonia to the solution in an amount in excess of that required to redissolve the hydroxides, suspending an inert supporting material in said solution, then removing the excess ammonia until a precipitate forms, and separating the precipitate and inert supporting material from the solution.

5. The catalyst of claim 4 characterized in that the precipitate has been subjected to reduction with hydrogen after separation from the solution.

6. A process for preparing a catalyst composition suitable for hydrogenation and dehydrogenation reactions, which comprises dissolving a copper salt and a zinc salt in water, adding ammonia to the solution in an amount in excess of that required to redissolve the precipitated hydroxides, suspending in said solution an inert supporting material, removing the excess ammonia from the solution, and separating the thus precipitated hydroxides from the solution.

7. A catalyst composition suitable for hydrogenation and dehydrogenation reactions prepared by dissolving, in water, salts of at least two non-ferrous metals whose hydroxides are soluble in excess ammonia, adding ammonia to the solution in an amount in excess of that required to redissolve the precipitated metal hydroxides, suspending an inert supporting material in such solution, removing the excess ammonia until a precipitate forms, and separating the precipitate and supporting material from the solution.

8. A catalyst composition suitable for hydrogenation and dehydrogenation reactions prepared by dissolving, in water, salts of at least two non-ferrous metals whose hydroxides are soluble in excess ammonia, adding ammonia to the solution in an amount in excess of that required to redissolve the precipitated metal hydroxides, suspending an inert supporting material in such solution, removing the excess ammonia until a precipitate forms, separating the precipitate and the inert supporting material from the solution, and subjecting the precipitate to reduction with hydrogen.

9. A catalyst composition suitable for hydrogenation and dehydrogenation reactions prepared by dissolving, in water, salts of at least two non-ferrous metals whose hydroxides are soluble in excess ammonia, adding ammonia to the solution in an amount in excess of that required to redissolve the precipitated metal hydroxides, suspending an inert supporting material in such solution, and then removing the excess ammonia by passing a current of inert gas thru the solution until a precipitate forms, separating the precipitate and the inert supporting material from the solution, and subjecting the precipitate to reduction with hydrogen.

10. A catalyst composition suitable for hydrogenation and dehydrogenation reactions prepared by dissolving, in water, salts of at least two non-ferrous metals whose hydroxides are soluble in excess ammonia, adding ammonia to the solution in an amount in excess of that required to redissolve the precipitated metal hydroxides, suspending an inert supporting material in such solution, and then removing the excess ammonia by passing a current of air thru the solution until a precipitate forms, separating the precipitate and the inert supporting material from the solution, and subjecting the precipitate to reduction with hydrogen.

11. A process for preparing a catalyst composition suitable for hydrogenation and dehydrogenation reactions, which comprises dissolving, in water, salts of at least two non-ferrous metals whose hydroxides are soluble in excess ammonia, adding ammonia to the solution in an amount in excess of that required to redissolve the precipitated metal hydroxides, suspending an inert supporting material in such solution, then removing the excess ammonia from the solution, and separating the precipitate and the inert supporting material from the solution.

12. A process for preparing a catalyst composition suitable for hydrogenation and dehydrogenation reactions, which comprises dissolving, in water, salts of at least two non-ferrous metals whose hydroxides are soluble in excess ammonia, adding ammonia to the solution in an amount in excess of that required to redissolve the precipitated metal hydroxides, suspending an inert supporting material in such solution, removing the excess ammonia from the solution, separating the precipitate and inert supporting material from the solution, and subjecting the precipitate to reduction with hydrogen.

13. A process for preparing a catalyst composition suitable for hydrogenation and dehydrogenation reactions, which comprises dissolving, in water, salts of at least two non-ferrous metals whose hydroxides are soluble in excess ammonia, adding ammonia to the solution in an amount in excess of that required to redissolve the precipitated metal hydroxides, suspending in said solution an inert supporting material, then removing the excess ammonia from the solution by passing a current of inert gas thru the solution, filtering the precipitate and inert supporting material from the solution, and subjecting the precipitate to reduction with hydrogen.

14. A process for preparing a catalyst composition suitable for hydrogenation and dehydrogenation reactions, which comprises dissolving, in water, salts of at least two non-ferrous metals whose hydroxides are soluble in excess ammonia, adding ammonia to the solution in an amount in excess of that required to redissolve the precipitated metal hydroxides, suspending in said solution an inert supporting material, then removing the excess ammonia from the solution by passing a current of air thru the solution, filtering the precipitate and inert supporting material from the solution, and subjecting the precipitate to reduction with hydrogen.

15. A process for preparing a catalyst composition suitable for hydrogenation and dehydrogenation reactions, which comprises suspending an inert supporting material in a solution containing the salts of at least two metals whose hydroxides are soluble in excess ammonia, adding ammonia to said solution in amount sufficient to redissolve the precipitated hydroxides, precipitating the hydroxides by removal of ammonia, and separating the precipitate and inert supporting material from the solution.

16. The process of claim 15 wherein the precipitated material is reduced with hydrogen after separation from the solution.

HERRICK R. ARNOLD.
WILBUR A. LAZIER.